US009764237B2

(12) United States Patent
Fukuda

(10) Patent No.: US 9,764,237 B2
(45) Date of Patent: Sep. 19, 2017

(54) ADVERTISEMENT DELIVERY SYSTEM, ADVERTISEMENT DELIVERY METHOD, AND ADVERTISEMENT DELIVERY PROGRAM

(76) Inventor: Hiromi Fukuda, Fukuoka (JP)

( * ) Notice: Subject to any disclaimer, the term of this patent is extended or adjusted under 35 U.S.C. 154(b) by 1280 days.

(21) Appl. No.: 12/999,288

(22) PCT Filed: Jun. 18, 2009

(86) PCT No.: PCT/JP2009/061788
§ 371 (c)(1),
(2), (4) Date: May 19, 2011

(87) PCT Pub. No.: WO2009/154313
PCT Pub. Date: Dec. 23, 2009

(65) Prior Publication Data
US 2011/0231262 A1    Sep. 22, 2011

(30) Foreign Application Priority Data

Jun. 18, 2008 (JP) .................................. 2008-159176

(51) Int. Cl.
*A63F 13/61* (2014.01)
*A63F 13/79* (2014.01)
(Continued)

(52) U.S. Cl.
CPC .............. *A63F 13/61* (2014.09); *A63F 13/12* (2013.01); *A63F 13/79* (2014.09); *G06Q 30/00* (2013.01);
(Continued)

(58) Field of Classification Search
USPC .................................................... 705/50–79
See application file for complete search history.

(56) References Cited

U.S. PATENT DOCUMENTS

| 6,139,429 A * | 10/2000 | Shoemaker, Jr. ................ 463/7 |
| 2003/0054888 A1* | 3/2003 | Walker et al. .................. 463/42 |
| 2008/0026847 A1* | 1/2008 | Mueller .................. A63F 13/10 463/42 |

FOREIGN PATENT DOCUMENTS

| CA | 2423871 A1 * | 4/2002 | ............. G06Q 30/02 |
| JP | 2000-042359 A | 8/2001 | |

(Continued)

*Primary Examiner* — Rutao Wu
*Assistant Examiner* — Darnell Pouncil
(74) *Attorney, Agent, or Firm* — Konomi Takeshita

(57) ABSTRACT

A system for delivering advertisements is provided capable of effectively advertising companies or products to users through a game as well as attracting the users' interest by varying the game difficulty in real-time according to user's responses. The system for delivering advertisements comprises a registration unit (212, 214) for registering information on one or more products provided from a company, information on the company, and condition information set by the company on conditions to win the products (e.g., whether or not a user accessed a company home page, browsed a movie, answered a questionnaire); a condition information providing unit 215 for providing the user with the registered information; an response information analyzing unit 221 for analyzing response information from the user as a response to the provided information; a game condition setting unit 222 for setting the game conditions; and a game execution unit 223 for determining whether or not the user wins the respective products based on the set conditions, wherein the system changes condition settings of tools for winning the respective products in the game based on the analysis results of the response information.

12 Claims, 10 Drawing Sheets

(51) Int. Cl.
 *A63F 13/30* (2014.01)
 *G06Q 30/00* (2012.01)
 *G06Q 30/02* (2012.01)

(52) U.S. Cl.
 CPC .. *G06Q 30/0269* (2013.01); *A63F 2300/5506* (2013.01)

(56) References Cited

FOREIGN PATENT DOCUMENTS

| | | | |
|---|---|---|---|
| JP | 2001-327749 | A | 11/2001 |
| JP | 2001-331719 | A | 11/2001 |
| JP | 2001-357275 | A | 12/2001 |
| JP | 2002-056293 | A | 2/2002 |
| JP | 2002-092464 | A | 3/2002 |
| JP | 2002-099851 | A | 4/2002 |
| JP | 2002-263373 | A | 9/2002 |
| JP | 2003-022396 | A | 1/2003 |
| JP | 2003-044647 | A | 2/2003 |
| JP | 2005-131231 | A | 5/2005 |
| JP | 2005-158050 | A | 6/2005 |
| JP | 2006-192029 | A | 7/2006 |
| WO | 03-095051 | A1 | 11/2003 |

\* cited by examiner

US 9,764,237 B2

ADVERTISEMENT DELIVERY SYSTEM, ADVERTISEMENT DELIVERY METHOD, AND ADVERTISEMENT DELIVERY PROGRAM

CROSS REFERENCE TO RELATED APPLICATIONS

This application claims priority under 35 U.S.C. 119 based upon Japanese Patent Application No. 2008-159176, filed on Jun. 18, 2008. The entire disclosure of the aforesaid application is incorporated herein by reference.

FIELD OF THE INVENTION

The present invention relates to a system for delivering advertisements to users through a telecommunication line, and particularly a system for delivering advertisements using games.

BACKGROUND OF THE INVENTION

Japanese Patent Publication Nos. 2005-131231 (Patent Document 1), 2005-158050 (Patent Document 2), 2002-56293 (Patent Document 3), and 2002-263373 (Patent Document 4) enclose techniques for distributing advertisements utilizing the Internet. The technique disclosed in the Patent Document 1 is an online game system capable of providing not only benefits within a game, but also real-world benefits such as coupons from a sponsor company, and also capable of advertising and marketing for the sponsor company while minimizing deviation from a game story in order to maintain interest and sense of achievement of players, wherein the game advances while one or more of advertisement, marketing or coupon services are selected in scenes that have minimal deviation from the game story. Thus sales may be effectively promoted while minimizing unpleasant experiences of the players. Also the players may enjoy the benefits of the coupons redeemable for actual products from the sponsor company as well as enjoying the sense of achievement in the game.

The technique disclosed in the Patent Document 2 is a method for delivering advertisements using a game, and which is capable of correctly estimating effectiveness of the advertisements, wherein the game includes items each associated with a product or a company, and wherein a cellular phone downloads software of the game from a content distribution server and stores a total number of runs of the downloaded software and a total runtime. The cellular phone uploads the total number of runs and the total runtime to an aggregation server with a predetermined timing. The aggregation server summarizes the total number of runs and the total runtime sent from the cellular phone.

The technique disclosed in the Patent Document 3 is a system comprising a mechanism for providing online advertisements for as many users as possible to view and also facilitating as many users as possible to click on the advertisements to access the advertisers' websites, wherein the system is capable of performing a process for growing an electronic character while downloading required information from other computers through a network; instructing the character to perform various actions depending on a user operation during the character growth process; and displaying the advertisements of a company or the like at the scene of the actions to thereby make the user view the advertisements in the course of enjoying the character growth in a game-like manner.

The technique disclosed in the Patent Document 4 is a method for effectively advertising using the Internet, wherein the method comprises the steps of opening, on the Internet, a game site comprising a plurality of pages sponsored by at least one company or organization; allowing users to log on to the game site via an Internet terminal and participate in a game; wherein the sponsor company is publicized and/or advertised in at least one of the pages deployed in the course of the game story.

Although the technique of the Patent Document 1 allows players to view the advertisement of the sponsor company by playing the game and to receive marketing information with the real-world benefits such as coupons, it cannot determine whether or not the players actually view the advertisement and fails to maximize the advertisement effectiveness.

Also this technique has the problem that the players lose their interest with monotonous task of receiving coupons or points according to the game advancement.

The technique of the Patent Document 2 makes an estimate on the advertisement effectiveness based on the total number of runs and the total runtime, which do not necessarily indicate the advertisement effectiveness, and therefore, the accuracy of its estimate is insufficient.

In addition, although the technique has a function for receiving comments on the contents, it has a problem that it may not collect enough questionnaire responses to its full effect without a mechanism for offering users an incentive to complete a tedious task of answering a questionnaire.

The techniques of the Patent Documents 3 and 4 display the advertisements of the sponsor company or the like, but cannot determine whether or not the advertisements are actually viewed to achieve their full effectiveness, and also cannot easily advertise for people not interested in games.

In view of the above, the purpose of the present invention is to overcome the aforementioned problems and provide a system, a method and a program for delivering advertisements capable of effectively advertising companies or products to users through a game as well as attracting the users' interest by varying the game difficulty in realtime according to user responses.

SUMMARY OF THE INVENTION (1. Changing Setting Condition of Tool Used in the Game)

According to the present application, there is provided a system for delivering advertisements to a user through a telecommunication line, comprising:

a registration unit for registering information on a product and a company that provides the product, and condition information for winning the product set by the company;

an information providing unit for providing the user with the information registered in the registration unit;

an analyzing unit for analyzing a response by the user to the information provided by the information providing unit;

a condition setting unit for setting a condition for winning the product based on a result of analysis by the analyzing unit and the condition information registered by the registration unit; and a determination unit for determining whether or not the user wins the product based on the condition set by the condition setting unit, wherein the determination unit is a product-winning game, and the condition setting unit changes a condition setting for a tool for winning the product in the product-winning game based on the result of analysis on said response by the analyzing unit.

Thus, the system for delivering advertisements disclosed in the present application creates an effect that enables a game to retain the user's interest in the game by providing the user with information on a product and a company that provides the product, and changing a condition setting of a tool for winning the product in the game based on the user response to the information, which controls the game difficulty in realtime.

In addition, the system creates an effect to allow effective advertisements of the product and company by controlling the game difficulty with the user responding to the product and company information to thereby raise the user awareness of the product and company information.

Further, by allowing the user to acquire the actual product that the user won during the game, the system provides an effect to motivate many users to participate in the game and enhance the advertisement effectiveness.

(2. Condition Information and Response Information)

According to the system for delivering advertisements disclosed in the present application, the above mentioned condition information is information on browsing and providing of the product's and/or company's information, and/or a question presented to the user; and the above mentioned response is a user's browsing or non-browsing of the product's and/or company's information, a response by the user to the provided information, and/or an answer to the question by the user.

Thus, the system disclosed in the present application provides an effect that its advertisement effectiveness may be dramatically increased by ensuring the product and/or company information being browsed and/or presented to the user and a question being presented to the user, thereby enabling the user to respond to the question, wherein the above mentioned condition information is information on browsing and providing of the product and/or company information, and/or a question presented to the user; and the above mentioned response information is whether or not the user browsed the product and/or company information, a user's response to the provided information, and/or a user's response to the question.

It is to be noted that "browsing of information" refers to, for example, browsing information by accessing a company or product home page; that "providing of information" refers to, for example, providing information by sending information about a company or a product in a form of an electronic file or e-mail; and that "question" refers to, for example, a questionnaire or an inquiries on a product or a company.

(3. Displaying Advertisements of Selected Product)

According to the system for delivering advertisements disclosed in the present application further comprises:

a list display control unit for displaying a list of information on products registered by the registration unit; and a product selection unit for selecting information on one of the products from the list of information displayed by the list display control unit based on an instruction from the user, wherein the information providing unit provides the user with at least information on the product selected by the product selection unit, or information on a company which provided the product.

Thus, by providing the product and company information for the product selected by the user, the system disclosed in the present application provides an effect in which the user's knowledge of the selected product may be deepened and the advertisement effectiveness may be enhanced.

(4. Managing Personal Information Including Points)

The system for delivering advertisements disclosed in the present application further comprises a customer management unit for managing information on the user, wherein the customer management unit manages at least personal information on the user and information on points held by the user.

Thus, with the customer management unit for managing information on the user, the system disclosed in the present application provides an effect to enable effective marketing towards customers.

Also by managing the information on customer points, the system provides an effect to promote customer retention using the points.

(5. Granting Points According to Response Information)

According to the system for delivering advertisements disclosed in the present application further comprises a point grant unit for granting the point to the user based on the information on the point held by the user, said information being managed by the customer management unit, based on a result of analysis of response information from the analyzing unit.

Thus, by granting points to the user based on analysis results of the response information to thereby increase the likelihood of the user to respond to the provided information in order to gain points, the system disclosed in the present application provides an effect in which information valuable to the company may be efficiently collected and the advertisement effectiveness may be enhanced by utilizing the provided information as advertisement medium.

It should be noted that when points are granted, different number of points may be set to be granted based on predetermined conditions. For example, when the user browses a home page about a product, an expected effectiveness of advertisements may be higher if the user navigates via links in the home page or scrolls to areas which are not initially displayed, than simply accessing the home page. In other words, more or fewer points may be granted depending on the user's operation history.

Also, when the user selects a new product from the displayed list of products, more points may be granted since this indicates higher advertisement effectiveness, and if the user selects the same product as before, fewer (or zero) points may be granted.

(6. Consuming Points to Participate in Game)

According to the system for delivering advertisements disclosed in the present application, the user with the obtained point can participate in the product-winning game by consuming the obtained point.

As such, by allowing the user to participate in the product-winning game by consuming the user's points, thus facilitating the user to participate in the game, and even allowing the user to win the product with the points depending on the game result, the system disclosed in the present application provides an effect to increase the number of game participants which will result in improved advertisement effectiveness.

(7. Consuming Points to Change Game Conditions)

According to the system for delivering advertisements disclosed in the present application, the user with the obtained point changes the condition to win the product by consuming the obtained point.

By changing the condition of, thus increasing the chance of the product winning by consuming the user points, the system disclosed in the present application provides an effect to increase the number of game-participating users to thereby improve the advertisement effectiveness.

(8. Advertisements of Company with Point System)

According to the system for delivering advertisements disclosed in the present application, the company has a point system for granting a point at a predetermined percentage to a value of a product or a service provided by the company, and the user's point managed by the customer management unit is utilizable in the point system of the company.

In this manner, since the company comprises the point system for granting points to the customer at a predetermined percentage of a value of a product or a service, wherein the user points managed by the customer management unit may be utilized in the point system comprised by the company, the system disclosed in the present application provides an effect in which the company may effectively carry out its advertisements and ensuring the loyalty of existing customers by extending its point applications.

(9. Setting Conditions from Point History)

According to the system for delivering advertisements disclosed in the present application, the condition setting unit sets the condition based on a point-granting history in the company's point system.

Thus, since the conditions are set based on the point-granting history in the company's point system, the system disclosed in the present application provides an effect to allow further motivation of the customer to purchase the product to thereby enhance the customer loyalty by, for example, setting the conditions so that the repeat customers may win the product relatively easily.

Conversely, the system provides an effect to allow an increase in the number of repeat customers by setting the conditions so that non-repeat customers may win the product relatively easily, and therefore, be motivated to become repeat customers.

In the above, the present invention has been described as a system, but as would be apparent to those skilled in the art, the present invention may be construed as a device, a method and a program. The foregoing summary of the invention is not a list of essential characteristics of the present invention and subcombination of these characteristics may be also within the scope of the present invention.

In other words, components of the system for delivering advertisements disclosed in the present application, or any combination of the components may be applied to a method, a device, a system, a computer program, a storage medium, a data structure and the like as other effective aspects of the present invention.

DETAILED DESCRIPTION OF THE INVENTION

Figure 1:
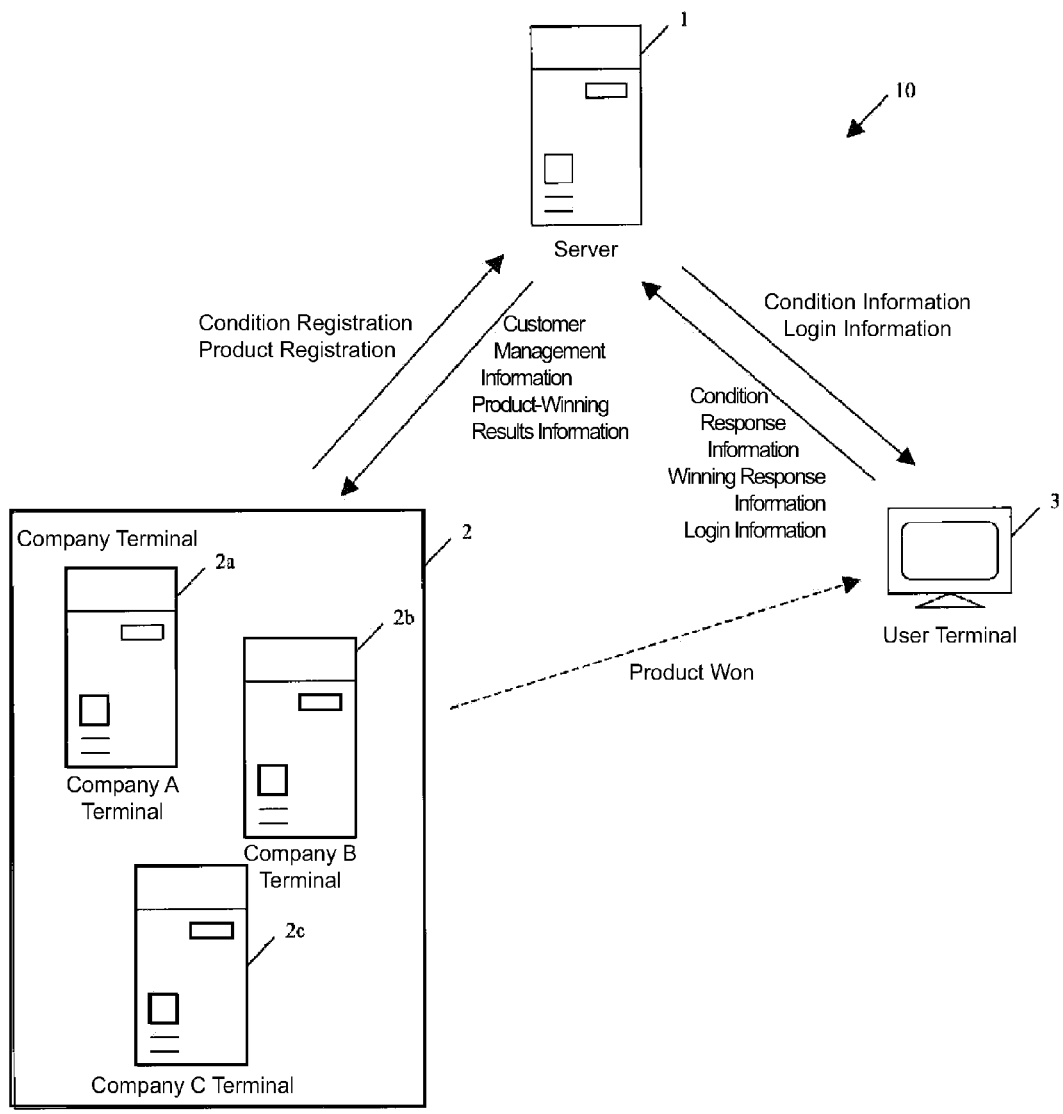
FIG. 1 is a structural diagram of a system for delivering advertisements according to a first embodiment.

Embodiments of the present invention will be described below. The present invention may be implemented in many different forms. Therefore, it should not be construed as limited by descriptions of such embodiments. Also the same or similar reference numerals and symbols are used to indicate the same or similar elements throughout these embodiments.

Systems are mainly discussed in the following embodiments, but as would be apparent to those skilled in the art, the present invention may also be implemented as a device, a method and a program for operating a computer. In addition, the present invention may be implemented in an embodiment of hardware, software, or hardware and software. Programs may be stored in any computer-readable media such as a hard disk, a CD-ROM, a DVD-ROM, an optical storage device or a magnetic storage device. Furthermore programs may be stored in other computers through a network.

First Embodiment of the Present Invention (1. Structure)

Figure 2:
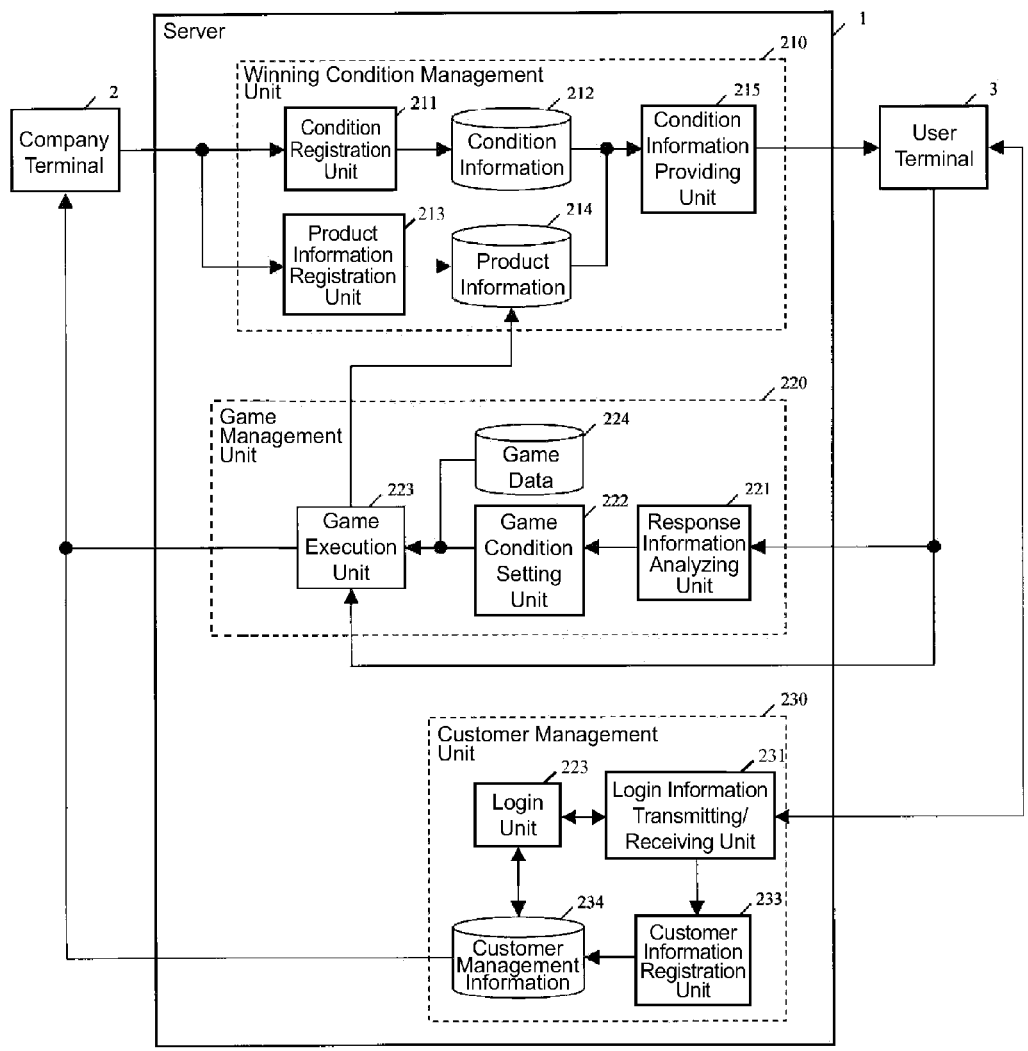
FIG. 2 is a function block diagram of a server in the system for delivering advertisements according to the first embodiment.
Figure 3:
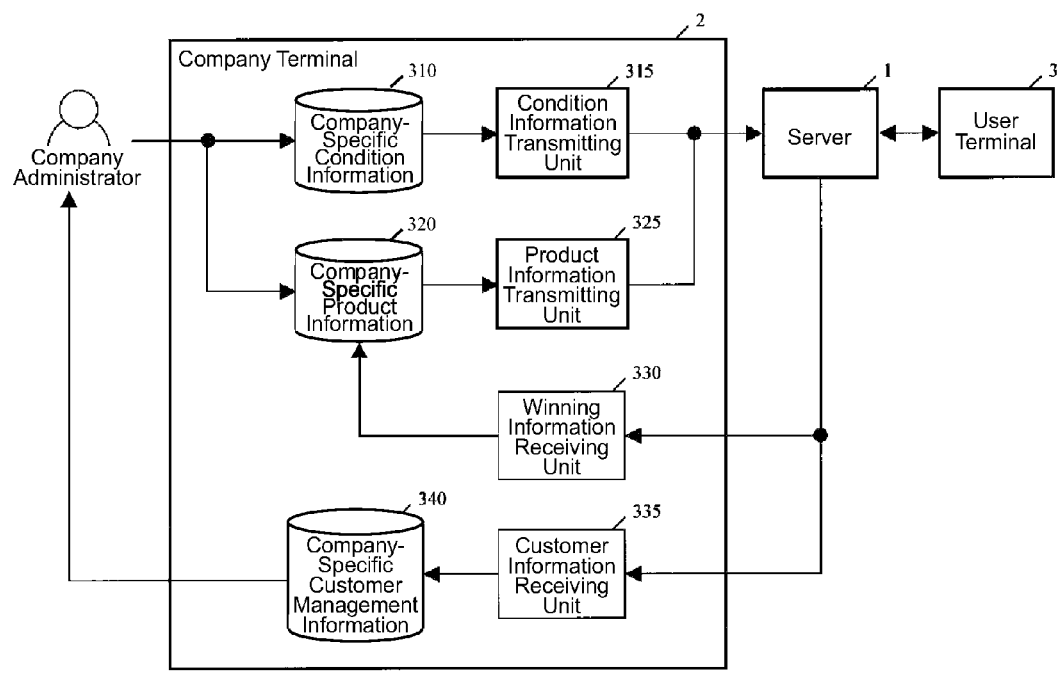
FIG. 3 is a function block diagram of a company terminal in the system for delivering advertisements according to the first embodiment.
Figure 4:
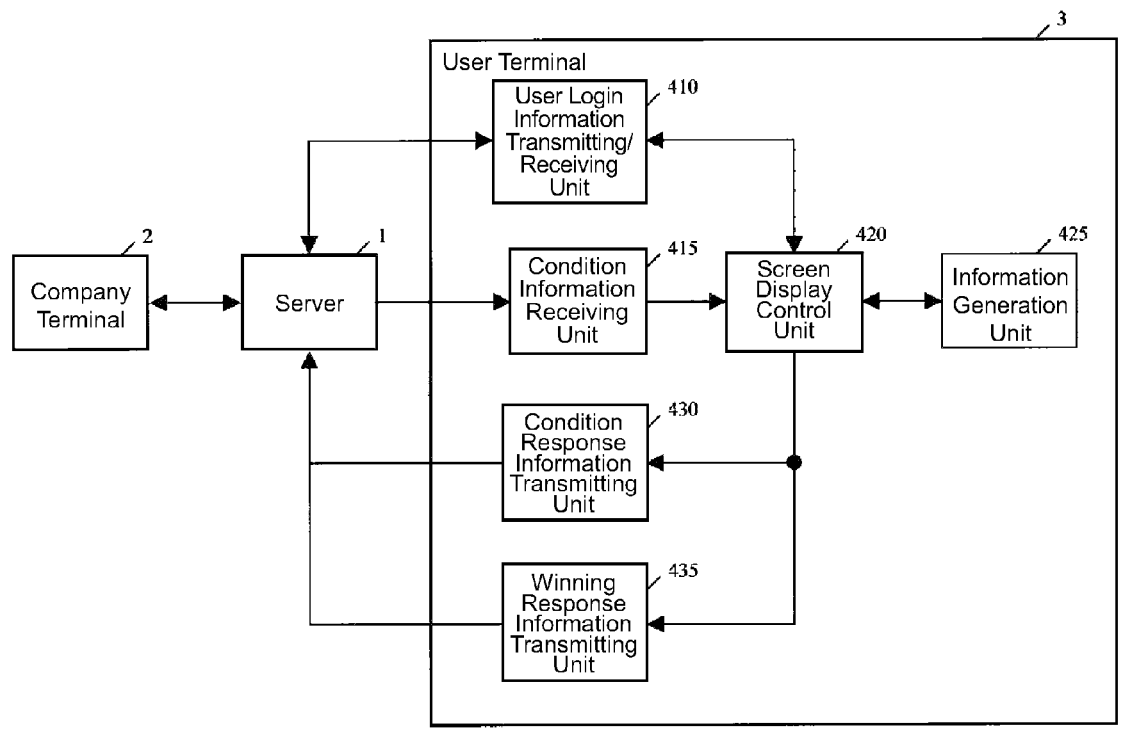
FIG. 4 is a function block diagram of a user terminal in the system for delivering advertisements according to the first embodiment.

In the following, structures included in a system for delivering advertisements according to the present invention will be discussed with respect to FIGS. 1 to 4. FIG. 1 is a structural diagram of a system for delivering advertisements according to the present embodiment; FIG. 2 is a function block diagram of a server in the system for delivering advertisements according to the present embodiment; FIG. 3 is a function block diagram of a company terminal in the system for delivering advertisements according to the present embodiment; and FIG. 4 is a function block diagram of a user terminal in the system for delivering advertisements according to the present embodiment.

(1-1. System Structure)

In FIG. 1, a system for delivering advertisements 10 according to the present embodiment comprises a server 1, a company terminal 2 and a user terminal 3. The company terminal 2 may be of one company, or may be structured to include company terminals 2a to 2c of various companies (e.g., companies A, B, C and the like) as shown in FIG. 1.

The server 1 is a terminal mainly used to by a system administrator for managing the entire system and comprises all information and applications regarding the system 1 as data. The company terminal 2 and the user terminal 3 access this server 1 to perform various tasks.

The company terminal 2 is a dedicated terminal for a company utilizing the system 10 and used mainly by an administrator of each company (hereafter referred to as "company administrator"). This company terminal 2 stores therein information such as product information and customer management information provided by the system 10 for each company. Using the company terminal 2, the company administrator accesses the server 1 and registers information on one or more products provided, conditions to win the products and the like. Additionally the company administrator receives user information, product-winning results and the like from the server 1 and stores these data items as management data.

The user terminal 3 is mainly used by a user utilizing the system 10. The user accesses the server 1 using the user terminal 3 and performs tasks such as registering personal information, browsing company or product information, answering a question, winning a product and the like. When a user wins a product, the server 1 notifies it to the company terminal 2 and the company transfers the actual product to the user.

It is to be noted that the product transfer may or may not involve providing money, but it is desirable not to do so in order to increase the number of users to improve advertisement effectiveness.

As a transfer method, for example, a product may be handed to its winner at a store owned by the company which provided the product, or delivered by shipment if the company does not own stores. Needless to say, a company which owns stores may also transfer a product by shipment.

(1-2. Server Structure)

In FIG. 2, the server 1 comprises a winning condition management unit 210, a game management unit 220 and a customer management unit 230. The winning condition management unit 210 comprises a condition registration unit 211, condition information 212, a product information registration unit 213, product information 214, and a condition information providing unit 215; the game management unit 220 comprises a response information analyzing unit 221, a game condition setting unit 222, a game execution unit 223 and a game data 224; and the customer management unit 230 comprises a login information transmitting/receiving unit 231, a login unit 232, a customer information registration unit 233 and a customer management information 234.

(1-2-1. Structure of Winning Condition Management Unit)

From the company terminal 2, the condition registration unit 211 receives information on conditions to win products and registers it as the condition information 212.

The condition information 212 is in a form of a database for storing information registered by the condition registration unit 211 and the information on conditions to win products is stored for each company and for each product. Specific examples of the condition information are, for example, to "access the company home page, brows a predetermined movie, and then answer one or more questions regarding the movie (condition 1)," "answer 100 questions in a questionnaire (condition 2)" and the like. Also the condition 1 and the condition 2 may be configured step-by-step. For example, information may be stored stating that probability to win a product becomes 50% after satisfying the condition 1 and the probability becomes 70% after satisfying the condition 2.

From the company terminal 2, the product information registration unit 213 receives information on products provided by one or more companies and registers the information as the product information 214.

The product information 214 is in a form of a database for storing information registered by the product information registration unit 213 and the information is regarding products provided to users by one or more companies.

The condition information providing unit sends users the information on conditions to win products provided by the companies based on the condition information 212 and the product information 214.

(1-2-2. Structure of Game Management Unit)

The response information analyzing unit 221 analyzes response information sent from users using their respective user terminals 3. The response information refers to information regarding user responses to condition information provided by the condition information providing unit 215 and, for example, whether or not a user accessed a company home page, browsed a movie, answered questions or a questionnaire and the like in response to the conditions 1 and 2. The response information analyzing unit 221 then passes analysis results on the response information to the game condition setting unit 222.

The game condition setting unit 222 sets probability to win products and difficulty of a game based on the analysis results from the response information analyzing unit 221. Specifically, this unit sets conditions of tools for winning the products during the game. For example, in the case of a product-fishing game, tools for fishing a product may be varied, or for a puzzle-solving game, the number and contents of hints may be varied in order to set the probability to win the products and difficulty of the game.

The game execution unit 223 reads the game data 224 and launches the game as well as incorporating the conditions set in the game condition setting unit 222 into the game data and executing the game.

(1-2-3. Structure of Customer Management Unit)

The login information transmitting/receiving unit 231 sends and receives user login information, authentication information and the like to and from the user terminal 3.

The login unit 232 compares the login information received by the login information transmitting/receiving unit 231 with login information stored in the customer management information 234 to thereby perform user authentication. The login unit 232 passes the authentication information to the login information transmitting/receiving unit 231 if both of the login information matches; otherwise it notifies the login information transmitting/receiving unit 231 that the user was not authenticated.

If a new user utilizes this system 10, the customer information registration unit 233 registers user information as customer information in the customer management information 234.

The customer management information 234 is in a form of a database for storing the user information as customer information registered by the customer information registration unit 233. This customer information contains variety of information concerning customers including not only personal information registered, but also the number of visits to the system 10, an operation history and the like.

Note that this customer management information 234 may be adapted to be shared with the company terminal 2, or may be adapted to be managed by the server 1 and copied and sent to the company terminal 2 at any given time.

(1-3. Structure of Company Terminal)

In FIG. 3, the company terminal 2 comprises a company-specific condition information 310, a condition information transmitting unit 315, a company-specific product information 320, a product information transmitting unit 325, a winning information receiving unit 330, a customer information receiving unit 335 and a company-specific customer management information 340.

The company-specific condition information 310 is in a form of a database for storing information on conditions to win products provided by one or more companies. Information stored therein concerns conditions set for each company and these conditions are registered by respective company administrators. When a plurality of products is provided, conditions are set and registered for each product. In addition, information required for the conditions to be satisfied (e.g., a company home page URL, a movie file, a questionnaire file and other required URL's or files) may also be registered.

The condition information transmitting unit 315 transmits the company-specific condition information 310 to the server 1. The transmitted information is registered in the server 1 and utilized for setting the game conditions.

The company-specific product information 320 is in a form of a database for storing information on the products provided by the companies.

The product information transmitting unit 325 sends the company-specific product information 320 to the server 1. The transmitted information is registered in the server 1 and utilized for the game.

It should be noted that the company-specific condition information 310 and the company-specific product information 320 as well as the condition information transmitting unit 315 and the product information transmitting unit 325 may be integrally formed, respectively. That is, information on products may be integrated with the information on conditions to win those products and stored in one database and the integrated information may be transmitted to the server 1.

When a user wins a product in the game executed by the server 1, the winning information receiving unit 330 receives the product winning information. Then the winning information is reflected in the company-specific product information 320. That is, when a user wins a product, information on the product is deleted from the company-specific product information 320.

The customer information receiving unit 335 receives information on the user as the customer information from the server 1 and stores the received customer information in the company-specific customer management information 340. The customer information includes not only personal information registered by each user, but also a history of accesses to information on each company and/or product, and a history of operations within the system for each user.

The company-specific customer management information 340 is in a form of a database for storing information received by the customer information receiving unit 335. The company administrator utilizes this information stored in the company-specific customer management information 340 for the company's advertisements and marketing.

It should be noted that, as shown above, the company-specific customer management information 340 and the customer management information 234 may be integrated into common information freely accessible by both of the system administrator and the company administrator.

(1-4. Structure of User Terminal)

In FIG. 4, the user terminal 3 comprises a user login information transmitting/receiving unit 410, a condition information receiving unit 415, a screen display control unit 420, an information generation unit 425, a condition response information transmitting unit 430 and a winning response information transmitting unit 435.

The user login information transmitting/receiving unit 410 sends and receives the user login information, authentication information and the like to and from the server 1.

The condition information receiving unit 415 receives the condition information from by the condition information providing unit 215 of the server 1.

The screen display control unit 420 controls a screen display of the user terminal 3. The user may perform a variety of reactions while viewing contents displayed on the screen. For example, when the user logs in, input fields for entering a login ID and a password may be displayed to thereby allow the user to enter the login ID and password in the input fields using a keyboard and/or a mouse, and click a login button using the mouse in order to send login information to the server 1.

The information generation unit 425 generates various information for communicating with the server 1. This information includes, for example, information on answers to a questionnaire, a history of accesses to a company home page and the like.

The condition response information transmitting unit 430 sends to the server 1 response information generated by the information generation unit 425 in relation to the information received by the condition information receiving unit 415.

The winning response information transmitting unit 435 sends to the server 1 the user reactions during the game execution. This is, for example, information on a fishing location and timing in the case of a fishing game, or information on an answer and a request for a hint for a puzzle-solving game. Based on this information received from the winning response information transmitting unit 435, the server 1 determines whether or not the user can clear the game.

(2. Operations)

Figure 5:
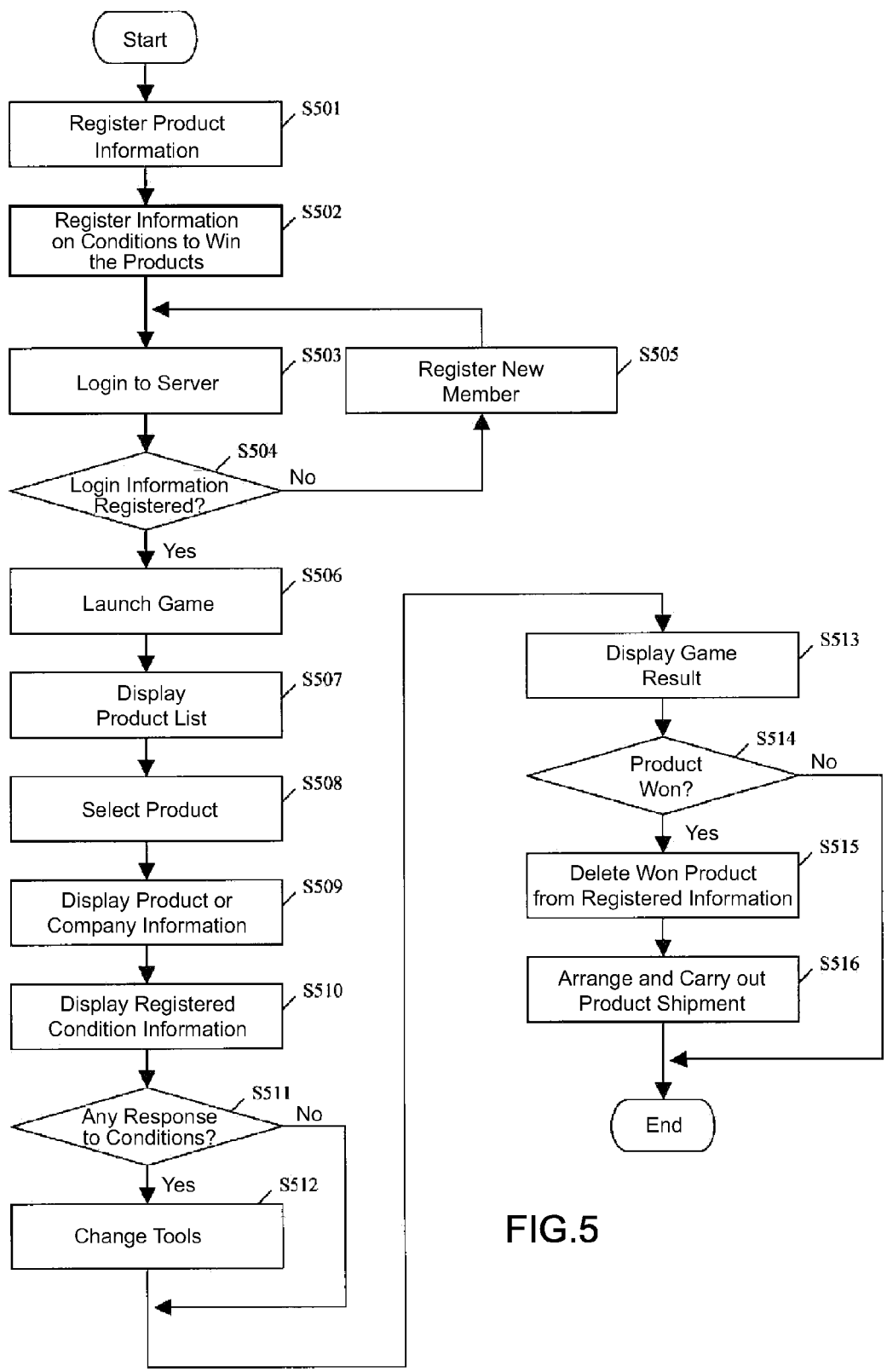
FIG. 5 is a flowchart showing operations of the system for delivering advertisements according to the first embodiment.
Figure 6:
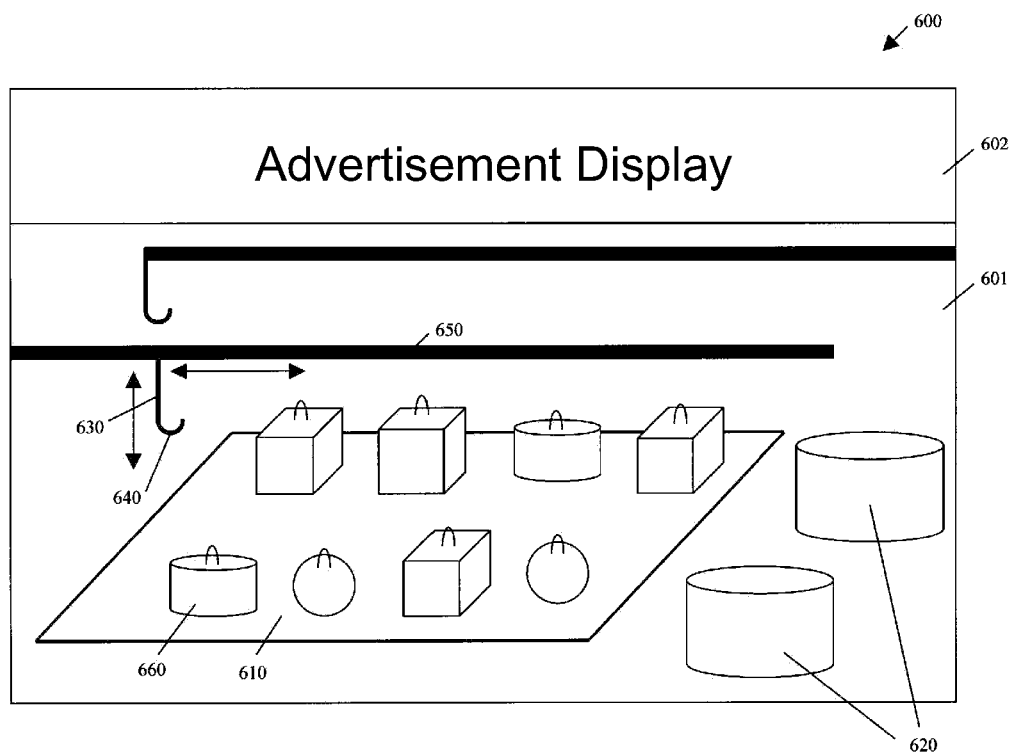
FIG. 6 is an example of a screen displayed when a game is launched in the system for delivering advertisements according to the first embodiment.
Figure 7:
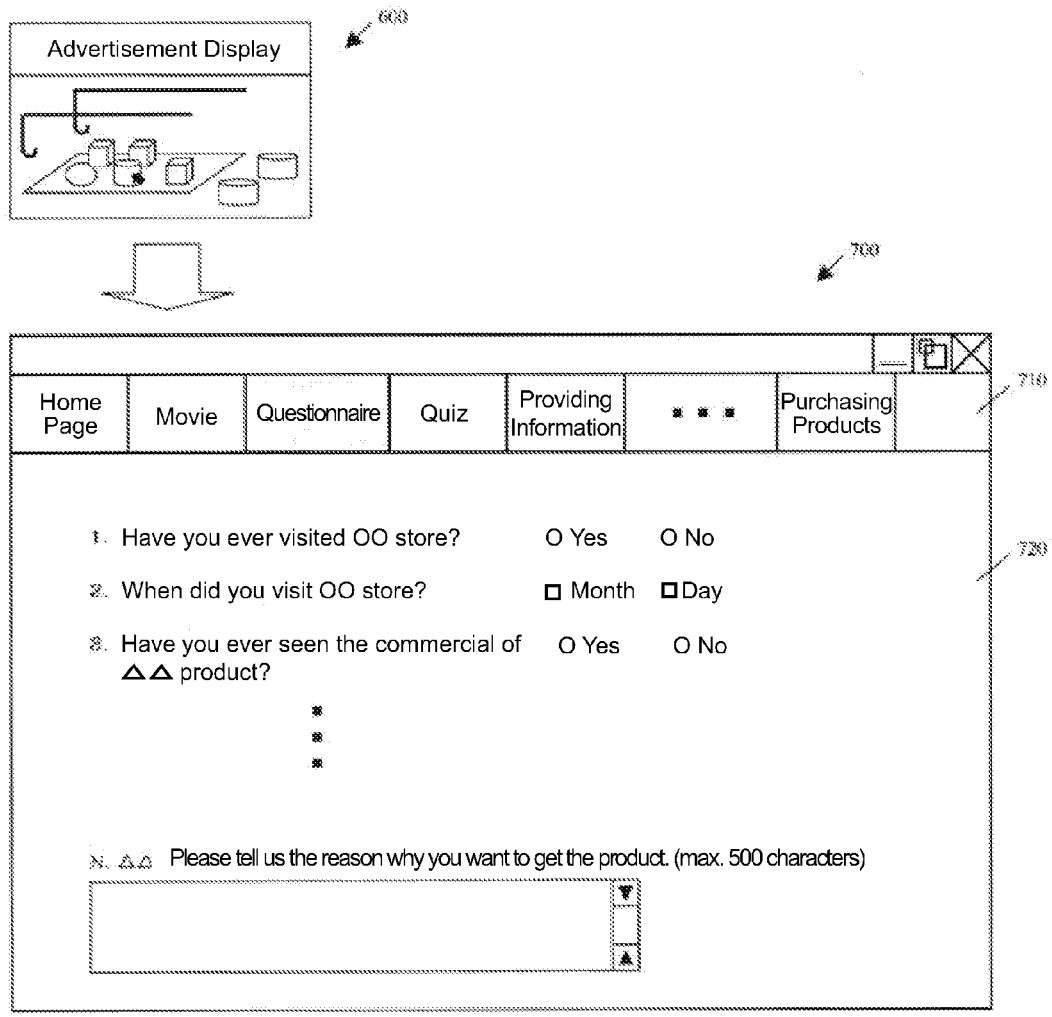
FIG. 7 is an example of a screen displayed when a user responds to condition information in the system for delivering advertisements according to the first embodiment.
Figure 8:
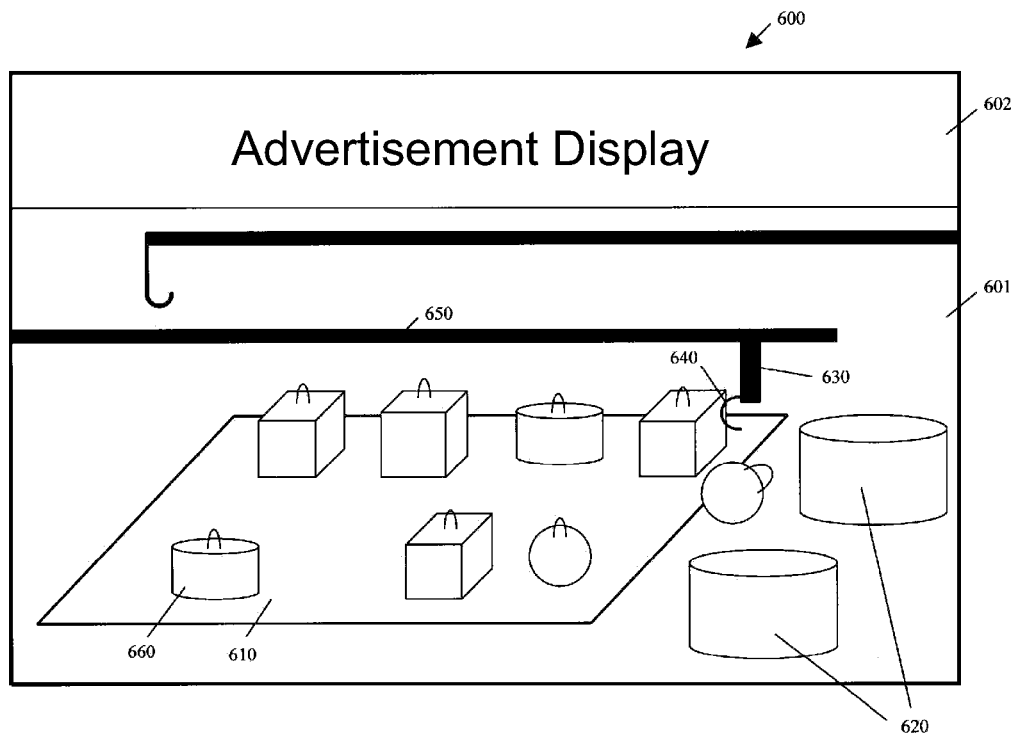
FIG. 8 is an example of a screen displayed when the game is executed in the system for delivering advertisements according to the first embodiment.

Below, specific operations of the system for delivering advertisements according to the present embodiment will be discussed with respect to FIGS. 5 to 8. FIG. 5 is a flowchart showing operations of the system for delivering advertisements according to the present embodiment; FIG. 6 is a an example of a screen displayed when a game is launched in the system for delivering advertisements according to the present embodiment; FIG. 7 is an example of a screen displayed when a user responds to condition information in the system for delivering advertisements according to the present embodiment; and FIG. 8 is an example of a screen displayed when the game is executed in the system for delivering advertisements according to the present embodiment.

In FIG. 5, the company administrator registers the product information from the company terminal 2 to the server 1 (Step S501) and simultaneously registers information on conditions to win the products to the server 1 (Step S502). The user logs in to the server 1 by submitting the login information from the user terminal 3 (Step S503) in order to win the products registered at the server 1. The system determines if the login information is registered in the customer management information 234 (Step 504) and newly registers the user if the login information is not registered (Step 505) to allow the user to log in using the newly registered login information.

After a successful login to the server 1, the game is launched (started) based on a user instruction (Step S506). When the game is launched, a list of products registered in the product information 214 is displayed (Step S507). One product is selected based on the user instruction (Step S508) and information is displayed on the selected product and a company which provided the product (Step S509).

In the following, screen displays in the processes up to Step S509 will be discussed in detail. In FIG. 6, a display area 600 comprises a game display unit 601 and an advertisement display unit 602. The game display unit 601 displays a product display area 610, products 660, product dropping holes 620, wires 630, hooks 640, and rails 650, and the advertisement display unit 602 displays information on the products displayed in the game display unit 601.

The user selects a product that the user wishes to win from a list of the products 660 displayed in the product display area 610. Upon this selection, the information regarding the selected product (e.g., an advertisement) or the company providing the product is displayed in the advertisement display unit 602. With predetermined manipulations, the user moves one of the wires 30 and the hook 640 connected thereto along the rail 650 and stops the wire 30 and hook 640 over the desired product. Then the user increases the length of the wire 630 with another predetermined manipulation. With the longer wire 630, the user makes the hook 640 latch onto the product, decreases the length of the wire 630 and moves the wire 630 over one of the product dropping holes 620. The user may win the product by successfully dropping the latched product into the product dropping hole 620.

It is to be noted that, until the user selects a product, the advertisement display unit 602 may randomly display information of the products displayed in the product display area 610 or the respective companies providing the products.

Alternatively, until the user selects a product, the advertisement display unit 602 may be divided according to the number and the display positions of the listed products so that the advertisements in the divided areas are displayed in correspondence with the product positions in the game display unit 601.

Further, if the screen cannot display all of the listed products due to the space limitation, the products may be grouped and displayed by category and the user may select one or more categories to display, or alternatively the products may be displayed in a plurality of pages and the user may freely display different pages.

Referring again to FIG. 5, after the product and/or company information is displayed in Step S509, the condition information registered in the condition registration unit 211 is displayed (Step S510).

In the following, displays of condition information will be discussed in detail. In FIG. 7 shows a response screen for the user to answer condition information displayed on the screen. A response screen 700 displays condition types 710 and condition contents 720 and when the user selects a condition type 710, condition contents 720 corresponding with the selected condition type 710 is displayed. The condition types 710 include, for example, "Home Page," "Movie," "Questionnaire," "Quiz," "Providing Information," "Purchasing Products" and the like. In FIG. 7, "Questionnaire" is selected.

When "Home Page" is selected for the condition type 710, a home page of the product selected in FIG. 6 and/or a home page of the company providing the product as well as information on links to these home pages are displayed, and the user may brows the home page information on the response screen 700.

When "Movie" is selected for the condition type 710, a movie (e.g., a commercial) about the product selected in FIG. 6 and/or a movie about the company providing the product are displayed, and the user may brows the movie or movies on the response screen 700.

When "Questionnaire" is selected for the condition type 710, a questionnaire about the product selected in FIG. 6 and/or a questionnaire about the company providing the product are displayed, and the user may answer the questionnaire or questionnaires on the response screen 700.

When "Quiz" is selected for the condition type 710, a question (e.g., a quiz) about the product selected in FIG. 6 and/or a question about the company providing the product are displayed, and the user may answer the question or questions on the response screen 700.

When "Providing Information" is selected for the condition type 710, an information entry form (e.g., for reputations, opinions, demands among people around the user) about the product selected in FIG. 6 and/or an information entry form about the company providing the product are displayed, and the user may provide the requested information on the response screen 700.

When "Purchasing Products" is selected for the condition type 710, the user may place an order for the product selected in FIG. 6. In this case, if the user wins the product in the game of FIG. 6 after placing the order, the product will be free of charge. Also if the user has a history of purchasing products, the probability to win the product in the game of FIG. 6 is changed according to a historical purchase amount. That is, if the user has purchased many products in the past, the probability to win the product in the game will be increased in order to ensure customer loyalty.

It should be noted that the response screen 700 and the condition types 710 in FIG. 7 are provided for exemplary purposes only, and it is understood that layout modifications of the response screen 700 and additions, modifications deletions and the like of the condition types 710 may be possible.

Referring again to FIG. 5, after the condition information is displayed on the response screen 700 in Step S510, whether or not the user has responded to the conditions is determined (Step S511) and if so, tools used in the game for winning the products are changed (Step S512). If the user has not responded to the conditions, no changes will be made. Then the user plays the game and the game result is displayed (Step S513).

In the following, execution of the game will be described in detail. In FIG. 8, the game is executed after the user responded to the condition information on the response screen 700. Compared to FIG. 6, that one of the wires 630 as a tool for winning the products became thicker because the user had responded to the conditions. Also the hook 640 connected to the thicker wire 630 became thinner. In other words, compared to FIG. 6, the hook 640 may be latched to the products more easily and the wire 630 is harder to break. With these changed tools, the user can win the products more easily than before responding to the conditions.

In FIG. 8, the wire 630 and the hook 640 were changed, but other changes or renditions may be made to facilitate the user to more easily win the products. For example, the product dropping holes 620 may be widened to more easily receive dropping products, or the loop on top of the products may be enlarged to more easily latch on to the hook 640.

Additionally the tools are changed according to the response to the condition information. For example, if the user responded to all of the condition types in FIG. 7, all of the modifiable tools may be changed, and if the user responded to some of the condition types, some of the tools may be changed. Also, the probability to win the product may be changed in accordance with the tool change.

Referring again to FIG. 5, after the game result is displayed in Step S513, whether or no the user has won the product is determined (Step S514) and if not, the user plays a game for another product or logs out to end the process. If the user has won the product, the product is deleted from the product information 214 (or a status of the product is changed as already won) (Step S515). Then shipment of the product is arranged and carried out (Step S516), and the process ends.

Thus, the system for delivering advertisements according to the present embodiment is capable of providing a game which retains the user's interest in the game by providing the user with information on products provided by companies and information on the companies, and changing setting conditions of tools for winning the products in the game based on the user responses to control the game difficulty in realtime.

In addition, the system is capable of effectively advertising the product and company by controlling the game difficulty with the user responding to the product and company information to thereby raise the user awareness of the product and company information.

Further, by allowing the user to acquire the actual product that the user won during the game, motivation of many users to participate in the game may be increased to enhance the advertisement effectiveness.

Still further, the advertisement effectiveness is dramatically increased by ensuring the user to brows and respond to the condition information and/or a question presented to the user and ensuring to obtain the response information, wherein the condition information comprises information on the product and/or company browsed by and provided to the user, and/or information on the question, and the response information comprises information on whether or not the user browsed the product and/or company information, information on user responses to the provided information, and/or information on user responses to the question.

Furthermore, by providing the product and company information for the product selected by the user, the user's knowledge of the selected product is deepened and the advertisement effectiveness is enhanced.

Second Embodiment of the Present Invention (1. Structure)

Figure 9:
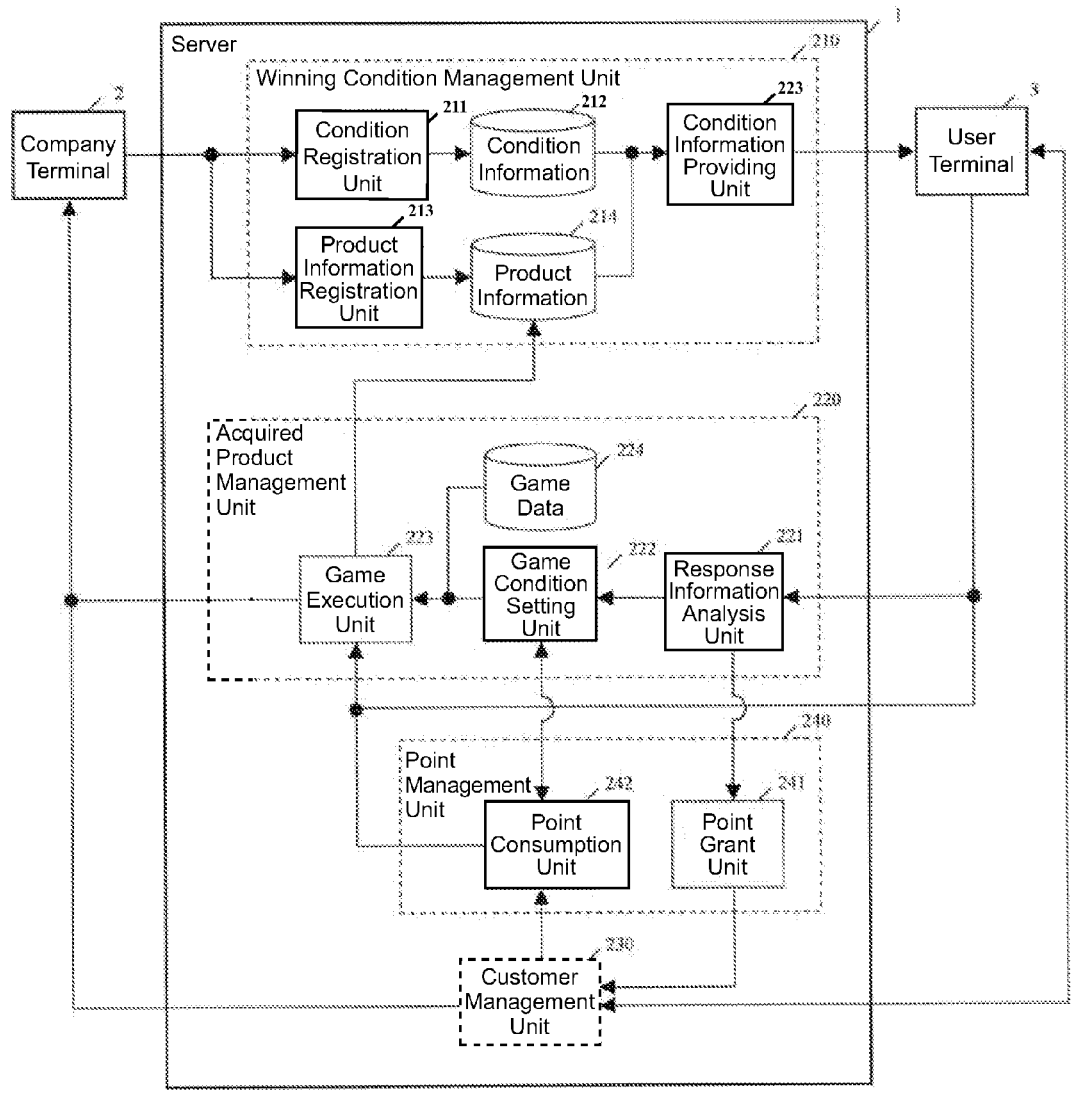
FIG. 9 is a function block diagram of a server in a system for delivering advertisements according to a second embodiment.
Figure 10:
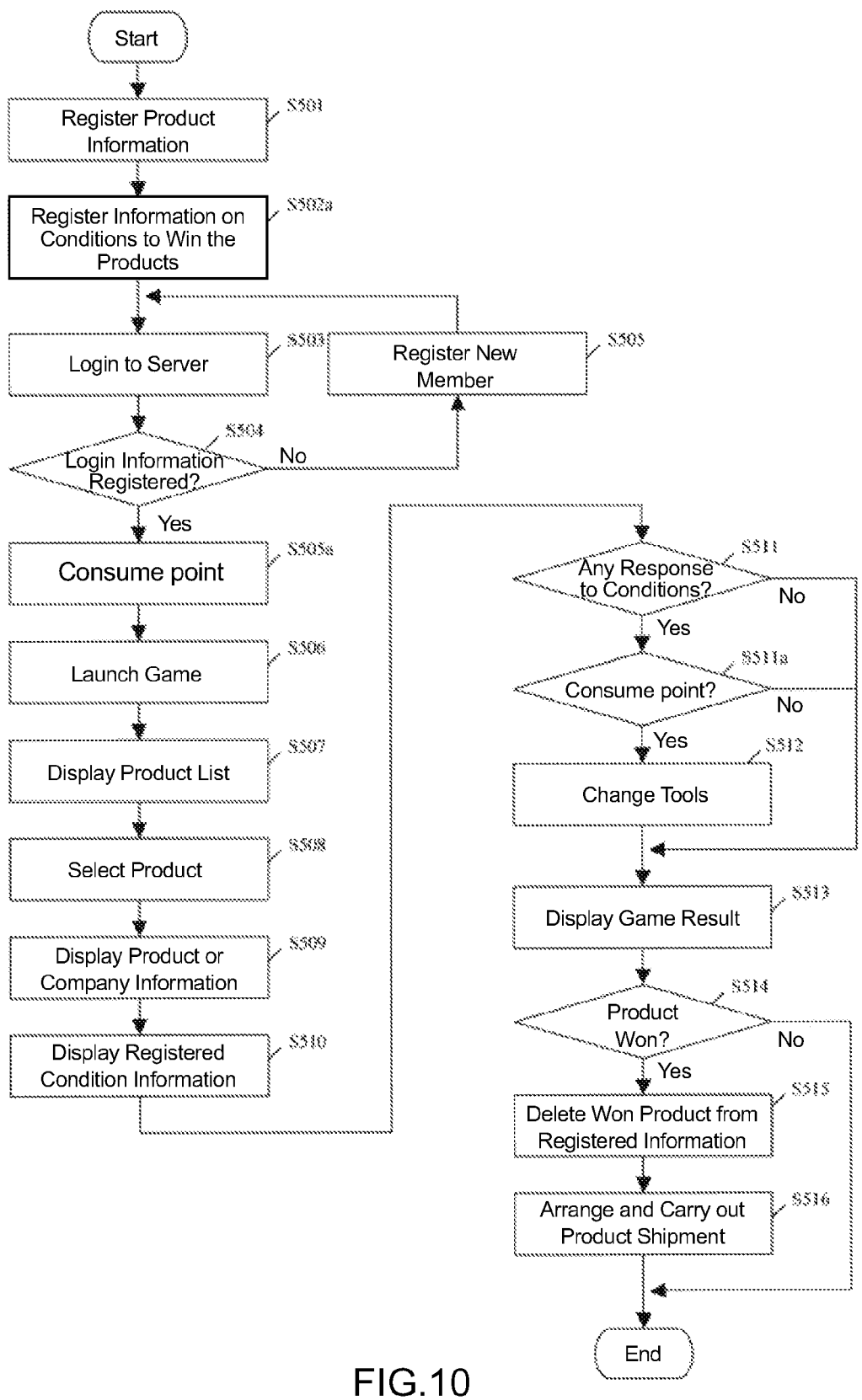
FIG. 10 is a flowchart showing operations of the system for delivering advertisements according to the second embodiment.

In the following, structures included in a system for delivering advertisements according to the present invention will be discussed with respect to FIGS. 9 and 10. FIG. 9 is a function block diagram of a server in a system for delivering advertisements according to the present embodiment; and FIG. 10 is a flowchart showing operations of the system for delivering advertisements according to the present embodiment.

The structures discussed here are ones different from those of the system for delivering advertisements according to the first embodiment. One difference of the second embodiment from the first embodiment of the system for delivering advertisements is that the former comprises a point management unit 240, which in turn comprises a point grant unit 241 and a point consumption unit 242. Additionally customer information managed by the customer management unit 230 includes point information for each customer. Further, registered in the condition information 212 is information regarding one or more points issued depending on conditions.

The point grant unit 241 grants one or more points based on analysis results from the response information analyzing unit 221. The granted points are managed for each customer in the customer management unit 230.

Note that the number of the granted points may be changed according to the response to the condition information. In the case of FIG. 7, for example, 10 points may be granted if the user answers a questionnaire, or 5 points may be granted if the user watches a movie.

Also when points are granted, different number of points may be set to be granted based on predetermined conditions. For example, when the user browses a home page about a product, an expected effectiveness of advertisements may be higher if the user navigates via links in the home page or scrolls to areas which are not initially displayed, than simply accessing the home page; therefore, more or fewer points may be granted depending on the user's operation history.

Further, when the user selects a new product from the displayed list of products, more points may be granted since this indicates higher advertisement effectiveness, and if the user selects the same product as before, fewer (or zero) points may be granted.

The point consumption unit 242 changes game launch and tool settings in exchange for the points managed in by the customer management unit 230. If points are consumed upon the game launch by the game execution unit 223 after the user login, the game is not launched until this point consumption unit 242 consumes the points. Also if the user wishes to enhance a tool which is already changed based on the response information, the user may consume the user's points in order to enhance the tool and increase the probability to win the product.

It should be noted that the number of points consumed for launching the game may be set the same for all users, and the number of points consumed for enhancing the tool may be set differently for each user. In other words, if the product is highly desirable for the user, the user may consume more points to enhance the tool; if the product is relatively undesirable for the user, the user may not consume any points.

Since the customer management unit 230 manages the points, the company-specific customer management information 340 of FIG. 3 may also manage the points for each customer. Further, the company-specific condition information 310 may also maintain point information for each condition.

(2. Operations)

In FIG. 10, the company administrator registers the product information from the company terminal 2 to the server 1 (Step S501) and simultaneously registers information on conditions to win the products to the server 1 (Step S502a). At this time, the number of points granted to the user for each condition is also registered. The user logs in to the server 1 by submitting the login information from the user terminal 3 (Step S503) in order to win the products registered at the server 1. The system determines if the login information is registered in the customer management information 234 (Step 504) and newly registers the user if the login information is not registered (Step 505) to allow the user to log in using the newly registered login information.

After a successful login to the server 1, predetermined points are consumed in exchange for launching (starting) the game (Step S505a). After the point consumption, the game is launched based on a user instruction (Step S506). When the game is launched, a list of products registered in the product information 214 is displayed (Step S507). One product is selected based on the user instruction (Step S508), information is displayed on the selected product and/or a company which provided the product (Step S509) and the condition information registered in the condition registration unit 211 is displayed (Step S510).

Whether or not the user has responded to the conditions is determined (Step S511) and if so, whether or not tools used in the game for winning the products should be changed in exchange for point consumption (Step S511a). If the tools should be changed, they are changed accordingly (Step S512). If the user has not responded to the conditions, or if the user consumes no points for changing the tools, no changes will be made. Then the user plays the game and the game result is displayed (Step S513). The subsequent processes are the same as in the first embodiment and thus omitted here.

As described above, the system for delivering advertisements according to the present embodiment manages information on the user points, and therefore, is capable of ensuring the customer loyalty using the user points.

Also since the system grants points to the user based on analysis results of the response information to thereby increase the likelihood of the user to respond to the provided information in order to gain points, this system is capable of efficiently collecting information valuable to the company as well as enhancing the advertisement effectiveness by utilizing the provided information as advertisement medium.

Further, by allowing the user to participate in the product-winning game by consuming the user's points, thus facilitating the user to participate in the game, and even allowing the user to win the product with the points depending on the game result, this system is capable of increasing the number of game participants which will result in improved advertisement effectiveness.

Still further, since the system changes the condition of, thus increases the chance of the product winning by consuming the user points, this system is capable of increasing the number of game-participating users to thereby improve the advertisement effectiveness.

Third Embodiment (1. Cooperation with Company-Comprised Point System)

As discussed above, the advertisement effectiveness may be enhanced by managing the points in the system according to the second embodiment, but if this system cooperates with an existing point system comprised by a company, the advertisement effectiveness and the customer loyalty may be further improved.

A company comprising a point system refers to a company which has implemented therein a system for establishing a repeat customer base, wherein the system grants each customer one or more points at a predetermined percentage of a value of a product or a service with which the company provides the customer, and the customer uses the granted points as part or all of the customer's next payment.

Also if customer management of a company comprising a point system includes management of a purchase history and a point-granting history, a probability to win products may be varied based on these histories. For example, the probability to win products is set high for repeat customers, who significantly contributes to the company's profit. Thus, the repeat customers will like the company even more with further increased willingness to purchase the company's products. Also the point system may be set to facilitate the repeat customers to win relatively expensive products and facilitate all other customers to win relatively inexpensive products. That is, probability of each customer to win a product may be varied based on the customer's purchase history.

It is to be noted that the point-granting history and the purchase history may be co-managed by the company-specific customer management information 340 of the company terminal 2 and by the customer management unit 230 of the server 1, or alternatively the server 1 and the company terminal 2 may comprise a separate history management table (not shown).

Also when cooperating the points, points of each company may be adapted "as is" to the present application or may be converted to the points of the present application. For example, if 10 points are consumed for participating in a game, and if a 10-point consumption is equivalent to a 10-yen payment for a company A and a 100-yen payment for a company B, an inequality is created between the companies A and B; in this case, a customer of the company A may convert 10 points to 10 points, and a customer of the company B may convert 10 points to 100 points. Thus, the inequality may be resolved.

As discussed above, according to the system for delivering advertisements of the present embodiment, the company comprises the point system for granting points to the customer at a predetermined percentage of a value of a product or a service, wherein the user points managed by the customer management unit 230 may be utilized in the point system comprised by the company and thus the company may effectively carry out its advertisements and ensuring the loyalty of existing customers by extending its point applications.

In addition, since the game conditions are set based on the point-granting history in the company's point system, the system according to the present embodiment is capable of further motivating the customer to purchase the product to thereby enhance the customer loyalty by, for example, setting the conditions so that the repeat customers may win the product relatively easily. Conversely, the system is capable of increasing the number of repeat customers by setting the conditions so that non-repeat customers may win the product relatively easily, and therefore, be motivated to become repeat customers.

Other Embodiments (1. System for Providing Products)

A system according to the present application may also be structured as a following system for providing system.

(1-1 Consuming Points to Participate in Product-Winning Game)

A system for providing one or more products to users through a telecommunication line, comprising: a registration unit for registering information on the products provided by a company comprising a point system for granting one or more points at a predetermined percentage of a value of a product or a service provided by the company; and a determination unit for determining whether or not a user wins a product registered by the registration unit based on point information of the user in the point system of the company, wherein the determination unit is a product-winning game, and a user may participate in the product-winning game by consuming the user's points.

Thus, a customer can more easily participate in the game to win the product by consuming the points than by having to pay cash to participate, and an advertisement effectiveness of the company and the products may be enhanced. Also the company may increase its profit by not only receiving a payment from the customer, but also earning the points that the user consumed.

(1-2 Referencing Point-Winning History)

The above system for providing products, wherein the determination unit determines whether or not a user wins a product based on the number of points consumed during the product-winning game and/or the point-winning history for the user.

Since whether or not a user wins a product is determined based on the number of consumed points and the point-winning history as discussed above, heavy point-consumers or repeat customers may be further motivated to purchase more products.

For effective advertisements, even non-repeat customers will have a positive image of the company by setting to facilitate their product winning.

It should be mentioned that, in each of the above embodiments, the product-winning game may be a game for virtually winning a product as shown in FIG. 6, or may be a game for granting a right to win a product when predetermined conditions are cleared. In a puzzle-solving game, for example, a right to win a product may be granted when all puzzles are solved. In that case, tools in the game such as the wires 630 and the hooks 640 may be replaced with the number and contents of hints. In other words, the number and contents of hints may be changed according to the response information. Thus, any game capable of setting conditions to be cleared may be implemented.

When the points are managed, points commensurate with a won product may be granted. That is, when a user wins a product A during a game, the user may receive the product A or alternatively convert the product A into points to be used in the next game. The user may freely decide to win either the product or the points.

Furthermore, the system for delivering advertisements according to the present invention may be applied to provide advertisements through home video game machines or through game devices installed at game arcades. In case of home game machines, for example, products may be provided and advertised via online games. Also in case of game arcades, products may be provided and advertised through sensory video games, or product-winning games for winning actual products.

While the present invention has been described with reference to each of the above embodiments, the technical scope of the present invention is not limited to these embodiments and various changes or improvements are possible. Such changed or improved embodiments are also within the technical scope of the present invention. This is apparent from the scope of the claims and summary of the present invention as well.

What is claimed is:

1. An advertisement delivery system for delivering web advertisements through a telecommunication network, comprising:
   a web server computer that administers the advertisement delivery system;
   a company terminal computer that is prepared for a company who delivers the web advertisements, the company providing a product; and
   a user terminal computer that reproduces (a) the web advertisements of the product, (b) an advertising video regarding the product, (c) a questionnaire regarding the product, (d) a quiz regarding the product, (e) an input screen for providing information of the product by the user, (f) a purchase order screen of the product, and (g) a web game played by the user to acquire the product on a display; wherein
   the web server computer comprises:
      a registration unit for registering product information that is provided by the company terminal computer, including information of the company, and condition information for winning the product set by the company to a database stored on a storage of the web server computer;
      an information providing unit that transmits (a) the product information registered in the database to the user terminal computer, (b) an instruction to display buttons for selecting the advertising video, (c) the questionnaire, (d) the quiz, (e) providing the information of the product and (f) purchase of the product to the user terminal computer;
      an analyzing unit for analyzing a response by the user received from the user terminal computer corresponding to (a) the product information, (b) the advertising video, (c) the questionnaire, (d) the quiz, (e) provided information by the user, and (f) the purchase order;
      a condition setting unit for setting a condition for winning the product based on a result of analysis by the analyzing unit and the condition information registered by the registration unit, and for determining a tool depicted in the web game, the tool reflecting a difficulty level of the web game based on the condition; and
      a game performing unit for loading a game data of the tool stored on the storage of the web server computer and executing the web game to acquire the product,
   the company terminal computer comprises:
      a transmitting unit for transmitting the product information and the condition information to the web server computer, so that the product information is displayed on the display, and
   the user terminal computer comprises:
      a receiving unit for receiving the information from the information providing unit;
      an information generating unit for generating response information based on an input by the user;
      a condition response information transmitting unit for transmitting the response information to the web server computer; and
      a winning response information transmitting unit for transmitting the user's response to the web game to the web server computer,
   wherein the tool and the product are displayed on the user terminal computer during the web game, the user virtually moves the tool based on the input by the user and the user acquires the product when the user wins the web game;
   said condition information comprises (a) information on how the product information is displayed on the web, (b) information on how the advertising video is displayed, (c) information on how the user answered to the questionnaire, (d) information on how the user answered to the quiz, (e) information provided by the user on the input screen, and (f) information on how the user places the purchase order; and
   said response information comprises information on how the user scroll the product information on the display so as to display an area that is not displayed on an initial view of the product information on the display.

2. The advertisement delivery system of claim 1, further comprising:
   a list display control unit for displaying a list of the product information registered by the registration unit; and
   a product selection unit for selecting the product information on one of the products from the list of information displayed by the list display control unit based on an instruction from the user.

3. The advertisement delivery system of claim 1, further comprising:
a customer management unit for managing information on the user,
wherein the customer management unit manages at least personal information on the user and point information on an obtained point held by the user.

4. The advertisement delivery system of claim 3, further comprising:
a point grant unit for granting the point to the user based on the point information, said point information being managed by the customer management unit, based on a result of analysis of the response information from the analyzing unit.

5. The advertisement delivery system of claim 3, wherein the user with the obtained point can participate in the web game by the obtained point.

6. The advertisement delivery system of claim 3, wherein the user with the obtained point changes the condition for winning the product by appropriating the obtained point.

7. The advertisement delivery system of claim 3, wherein the company has a point system for granting a point at a predetermined percentage to a value of a product or a service provided by the company, and the user's point managed by the customer management unit is utilizable in the point system of the company.

8. The advertisement delivery system of claim 7, wherein the condition setting unit sets the condition based on a point-granting history in the company's point system.

9. The advertisement delivery system of claim 1, wherein the condition setting unit changes a size of the tool depicted in the web game so as to reflect the difficulty level of the web game based on the condition.

10. The advertisement delivery system of claim 1, wherein
said response information further comprises how the user clicks links of the product information on the web.

11. The advertisement delivery system of claim 1, wherein when the user wins the web game, the web server computer processes shipment transaction of the product.

12. The advertisement delivery system of claim 1, wherein the buttons for selecting (a) the web advertisements of the product, (b) the advertising video regarding the product, (c) the questionnaire regarding the product, (d) the quiz regarding the product, (e) the input screen for providing information of the product by the user, and (f) the purchase order screen of the product are collectively displayed on the display.

* * * * *